United States Patent [19]
Chen et al.

[11] Patent Number: 5,185,106
[45] Date of Patent: * Feb. 9, 1993

[54] TOWER PACKING WITH SMALL LOUVERS AND MIXING METHOD

[75] Inventors: Gilbert K. Chen, Farmers Branch; Robert McKelvy; Jorge A. Bonilla, both of Dallas; Don Glaspie, Dallas; George De Bruyn, Irving, all of Tex.

[73] Assignee: Glitsch, Inc., Dallas, Tex.

[*] Notice: The portion of the term of this patent subsequent to Oct. 12, 2008 has been disclaimed.

[21] Appl. No.: 747,286

[22] Filed: Aug. 19, 1991

Related U.S. Application Data

[63] Continuation-in-part of Ser. No. 618,724, Nov. 27, 1990, Pat. No. 5,057,250, and a continuation-in-part of Ser. No. 618,725, Nov. 27, 1990, Pat. No. 5,080,836.

[51] Int. Cl.$^5$ .............................. B01F 5/00; B01F 3/04
[52] U.S. Cl. .................................. 261/112.2; 422/256
[58] Field of Search ........................ 261/112.1; 422/256

[56] References Cited

U.S. PATENT DOCUMENTS

| | | |
|---|---|---|
| 2,582,826 | 1/1952 | Glitsch . |
| 2,611,596 | 9/1952 | Glitsch . |
| 2,615,792 | 10/1952 | Pacsik ........................ 422/256 |
| 2,768,071 | 10/1956 | Pokorny et al. ............. 422/256 |
| 3,008,553 | 11/1961 | Glitsch et al. . |
| 3,013,782 | 12/1961 | Glitsch . |
| 3,079,134 | 2/1963 | Winn . |
| 3,080,155 | 3/1963 | Glitsch et al. . |
| 3,087,711 | 4/1963 | Glitsch . |
| 3,233,708 | 2/1966 | Glitsch . |
| 3,343,321 | 9/1967 | Winn et al. . |
| 3,652,066 | 3/1972 | Faigle . |
| 3,785,620 | 1/1974 | Huber . |
| 3,830,684 | 8/1974 | Hamon . |
| 3,959,419 | 5/1976 | Kitterman . |
| 3,969,447 | 7/1976 | Glitsch et al. . |
| 4,123,008 | 10/1978 | McClain . |
| 4,128,684 | 12/1978 | Bomio et al. . |
| 4,139,584 | 2/1979 | Holmberg . |
| 4,198,002 | 4/1980 | McClain . |
| 4,296,050 | 10/1981 | Meier . |
| 4,597,916 | 7/1986 | Chen . |
| 4,604,247 | 8/1986 | Chen et al. . |
| 4,643,853 | 3/1987 | Braun . |
| 4,676,934 | 6/1987 | Seah . |
| 4,729,857 | 3/1988 | Lee et al. . |
| 4,842,778 | 6/1989 | Chen et al. . |
| 4,909,967 | 3/1990 | Binkley et al. . |
| 4,950,430 | 8/1990 | Chen et al. . |
| 4,956,127 | 9/1990 | Binkley et al. . |

FOREIGN PATENT DOCUMENTS

| | | |
|---|---|---|
| 294635 | 2/1971 | U.S.S.R. . |
| 1004046 | 9/1965 | United Kingdom . |
| 1341981 | 12/1973 | United Kingdom . |

OTHER PUBLICATIONS

G. Chen, "Packed Column Internals", Chemical Engineering, Mar. 5, 1984.
Rombopak eine geordnete Packung fur Rektifikation und Aborption Product Brochure.
Kuhni AG Plants and Equipment for the Chemical Industry Product Brochure.
Raschig Ralu-Pak 250 VC Product Brochure.

*Primary Examiner*—Tim Miles
*Attorney, Agent, or Firm*—Johnson & Gibbs

[57] ABSTRACT

Method of and apparatus for multi-phase contact utilizing louvered structured packing. the packing is provided in corrugated sheets and between the fold lines of the corrugations, and a plurality of large louvered openings are disposed in generally parallel spaced relationship. An array of small louvers is disposed across the sheets, and each of the louvers is oriented for selectively vectoring the flow of liquid-vapor or liquid-liquid around and through the corrugated sheets when disposed within a chemical process tower.

38 Claims, 5 Drawing Sheets

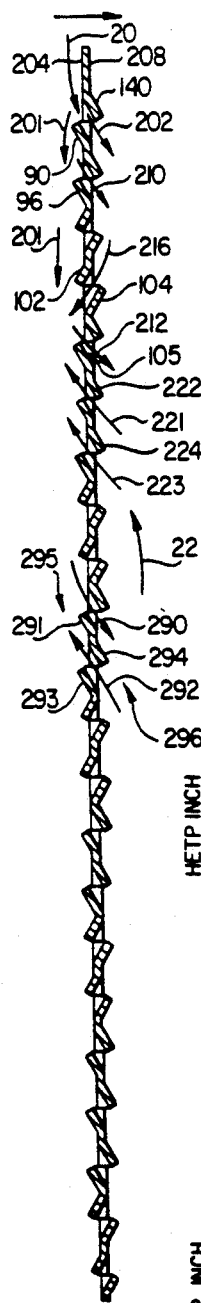
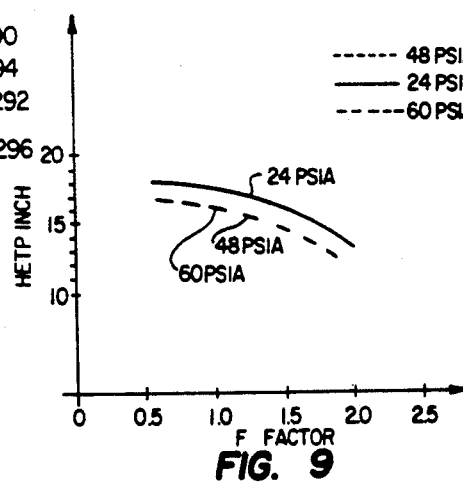
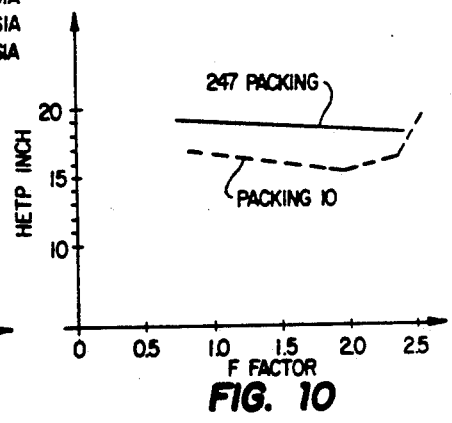
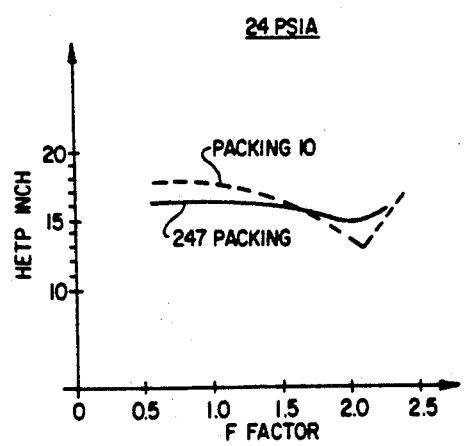
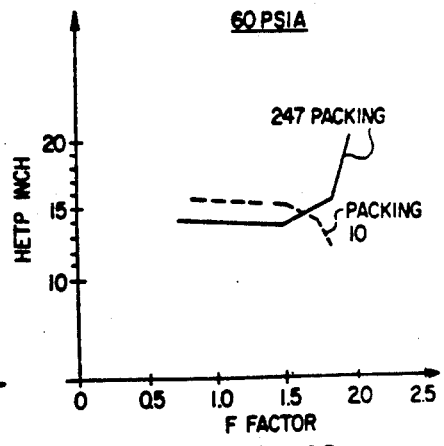
FIG. 8
FIG. 9
FIG. 10
FIG. 11
FIG. 12

TOWER PACKING WITH SMALL LOUVERS AND MIXING METHOD

This is a continuation-in-part of U.S. patent application Ser. Nos. 07/618,724 filed Nov. 27, 1990, now U.S. Pat. No. 5,057,250, and 07/618,725 filed Nov. 27, 1990, now U.S. Pat. No. 5,080,836.

BACKGROUND OF THE INVENTION

1. Field of the Invention

The present invention relates to structured packing for multi-phase process towers including both vapor-liquid and liquid-liquid process towers and, more particularly, to a packing made up of corrugated, louvered contact plates disposed in face-to-face contact for use in such process towers.

2. History of the Prior Art

In the vapor-liquid and liquid-liquid contact art, it is highly desirable to utilize methods and apparatus that efficiently improve the quantity of the mass and/or heat transfer occurring in process towers. The technology of such process towers is replete with various packing designs used for tower packing. The types of packing employed are functions of the particular process to be effected within the tower. The packing elements may thus comprise a structured array (structured packing) arranged to form a regular array inside the column or relatively small shapes such as rings or saddles dumped into and randomly arranged (dump packing) within the tower. Close fractionation and/or separation of the feed stock constituents introduced into the tower and the elimination of harmful or undesirable residual elements impart criticality to the particular vapor-liquid or liquid-liquid contact apparatus chosen for a given application. The shape of the dump or structured packing elements determines the flow patterns in and density of the array and the resultant resistance to flow caused thereby. Prior art structured packing arrays have thus found utility in a variety of shapes, sizes, and material forms.

It has been found particularly desirable in the vapor-liquid contact portion of the prior art to provide apparatus and methods affording efficient heat transfer, fluid vaporization, or vapor condensing duty whereby cooling of one of the fluids can be accomplished with a minimum pressure drop through a given zone of minimum dimensions. High efficiency, low pressure drop, and reduced temperature gradients are important design criteria in the chemical engineering art, such as petroleum fractionation operations. Vapor-liquid process towers for effecting such operations are generally of the character providing descending liquid flow from an upper portion of the tower and ascending vapor flow from a lower portion of the tower. Sufficient surface area for vapor-liquid contact is necessary for the primary function and the reduction or elimination of liquid entrainment present in the ascending vapor. Most often it is necessary for the structured packing array to have sufficient surface area in both its horizontal and vertical planes so that fractions of the heavy constituents are conducted downwardly in condensed form and the vapors are permitted to rise through the packing with minimum resistance. With such apparatus, heavy or light constituents of the feed are recovered at the bottom and top of the tower, respectively, by the interaction of the ascending vapor and descending liquid, mostly upon the surface of the structured packing. Similar considerations apply to the design of towers for liquid-liquid extraction operations.

Similarly, it has also been found desirable in the liquid-liquid contact portion of the prior art to provide apparatus and methods affording efficient heat transfer, or liquid-liquid contact whereby contact of the fluids can be accomplished with a minimum pressure drop through a given zone of minimum dimensions. High efficiency and low pressure drop are important design criteria in liquid-liquid extraction operations. Mass transfer liquid-liquid process towers for effecting such operations are generally of the character providing descending heavy liquid flow from an upper portion of the tower and ascending light liquid from a lower portion of the tower. Sufficient surface area for liquid-liquid contact is necessary for the primary function and the reduction or elimination of heavy liquid entrainment present in the ascending lighter liquid. Most often it is necessary for the structured packing array to have sufficient surface area in both its horizontal and vertical planes so that fractions of the heavy constituents are conducted downwardly and the lighter liquid is permitted to rise through the packing with minimum resistance. With such apparatus, heavy or light constituents of the feed are recovered at the bottom or top of the tower, respectively, by the interaction of the ascending light liquid and descending heavy liquid, mostly upon the surface of the structured packing.

In a vapor-liquid tower a plurality of stacked layers affording compatible and complemental design configurations are generally assembled within a single process column. When used in vapor-liquid applications, each layer utilizes the velocity and kinetic energy of the ascending vapors to perform the dual function of eliminating liquid entrainment in the ascending vapor and the thorough and turbulent contacting of the vapor with the descending liquid to accomplish sufficient separation or fractionation of the fluids into desired components. Quick cooling of the ascending vapor is generally a prerequisite for efficient operation to effect efficient heat transfer for vapor condensation and minimum pressure drop in a minimum vertical depth of the packing. Oppositely inclined, corrugated lamellae, or plates, have thus been utilized in the prior art for affording multiple vapor passages through the horizontal and vertical planes of the packing layers to insure the flow of vapor and distribution thereof within the lamellae and to prevent maldistribution, or channeling, of the vapor through certain portions of the layers and not others. Only in this manner is efficient and effective utilization of the column and the energy applied therein effected.

In a liquid-liquid tower a plurality of stacked layers affording compatible and complemental design configurations are generally assembled within a single process column. Each layer utilizes the velocity and kinetic energy of the fluids to perform the dual function of eliminating heavy liquid entrainment in the ascending liquid phase and the thorough contacting of the light and heavy liquids to accomplish sufficient separation or extraction of the fluids into desired components. Oppositely inclined, corrugated lamellae, or plates, have thus been utilized in the prior art for affording multiple light phase passages through the horizontal and vertical planes of the packing layers to insure the flow of lighter liquid and distribution thereof within the lamellae and to prevent maldistribution, or channeling, of the lighter liquid through certain portions of the layers and not others. Only in this manner is efficient and effective utilization of the column and the energy applied therein effected.

In vapor-liquid applications the structural configuration of inclined, corrugated contact plates of the prior art variety often incorporates holes for vapor passage. Vapor turbulence is created by such holes to insure intimate vapor-liquid contact. It is also necessary to insure that the ascending vapor performs a dual function of liquid contact and liquid disentrainment within close proximity to the vertical location at which the ascending vapor approaches or leaves the vapor passage holes. In this manner maldistribution of the ascending vapor or descending liquid is reduced.

In liquid-liquid applications the structural configuration of inclined, corrugated contact plates of the prior art variety often incorporates holes for liquid passage. Turbulence is created by such holes to insure intimate light and heavy phase contact. It is also necessary to insure that the ascending light phase performs a dual function of phase contact and liquid disentrainment within close proximity to the vertical location at which the ascending phase approaches or leaves the passage holes. In this manner maldistribution of the ascending or descending phases is reduced. It is, moreover, a paramount concern of the prior art to provide such methods and apparatus for vapor-liquid or liquid-liquid contact in a configuration of economical manufacture. Such considerations are necessary for cost-effective operation.

Oppositely inclined corrugated plates provide but one method and apparatus for countercurrent, liquid-vapor, or liquid-liquid interaction. With such packing arrays, the liquid introduced at or near the top of the column and withdrawn at the bottom is effectively engaged by vapor or a second liquid stream being introduced at or near the bottom of the column and withdrawn at the top. The critical feature in such methods and apparatus is to insure that the liquid and vapor (or second liquid) achieve the desired degree of contact with each other so that the planned mass or energy transfer occurs at the designed rate. The internal structure is, of course, passive in the sense that it is not power driven externally and has few, if any, moving parts.

The prior art is replete with passive vapor-liquid and liquid-liquid contact devices utilizing cross-fluted and perforated sheets of material in face-to-face engagement. This configuration encourages the liquid moving through the packing to form itself into films having, in the aggregate, a large area over which the light phase may pass. However, the design problem is not merely a matter of providing a large surface area or a multitude of corrugations, cross-flutes, or perforations. A number of other interrelated design considerations must be taken into account, some of which have been mentioned above.

From a process standpoint, it is important that the desired vapor-liquid or liquid-liquid contact interaction be carried as close to completion as possible. For example, in a crude oil vacuum tower, efficient fractionation and good separation are needed to produce oil streams that are free of undesirable residual elements. As mentioned above, the contact column and its internal apparatus must efficiently utilize the heat supplied to the unit. In this manner, direct operating costs are minimized whether the objective is mass transfer, heat transfer, liquid-vaporization, or vapor condensing duty. With the above, pressure drop is a primary consideration as is the vapor-liquid fluid interface. Structured packing for vapor-liquid contact has been shown in the prior art in such references as U.S. Pat. Nos. 3,343,821, issued Sep. 26, 1967; 4,139,584, issued Feb. 13, 1979; 4,128,684, issued Dec. 5, 1978; 3,785,620, issued Jan. 15, 1974; and 3,959,419, issued May 25, 1976.

As pointed out above, the desired vapor-liquid or liquid-liquid contact interaction should be carried as close to completion as possible. For example, in a light hydrocarbons amine contactor, efficient extraction of $H_2S$ (hydrogen sulfide) is needed to produce fuel streams that are free of undesirable $H_2S$ pollutant.

In the above-referenced vapor-liquid contact method and apparatus patents, several design configurations are presented for affording intimate vapor-liquid contact. In particular, stacked, corrugated contact plates in face-to-face contact, having corrugations inclined to the horizontal and/or orthogonal one to the other, have been shown and provided in various material configurations. These configurations include monofilament yarns and solid plates. It is, moreover, prominent in the prior art to utilize fluted plates having a plurality of perforations therethrough. One such example is seen in U.S. Pat. No. 4,296,050 issued Oct. 20, 1981, while another is seen in British patent no. 1,004,046, published Sep. 8, 1965.

While many prior art methods and apparatus for vapor-liquid or liquid-liquid contact have been shown to be relatively effective, certain disadvantages still remain. In particular, vapor-liquid contact towers incorporating descending liquid flow and ascending vapor flow of the structured packing variety defined above are generally incapable of readily accommodating internal pressure differentials. Problems also exist with surfaces that face downward because such surfaces are generally not effectively wetted. Even with slits or lancing of the packing there are many downward facing surfaces, and few prior art designs effectively address proper wetting or vapor passage therethrough. This is true even with a plurality of apertures disposed in corrugated and/or cross-fluted plates in face-to-face contact such as those referenced above. Vapor flow is ultimately sensitive to pressure differentials, and is easily diverted between the myriad of exposed areas of mating corrugations or flutes. In phase contact towers incorporating descending heavy liquid flow and ascending light liquid flow of the structured packing variety defined above, difficulties have been encountered in readily accommodating internal pressure differentials. Problems also exist with surfaces that face downward because such surfaces are generally not effectively covered by the liquids. Even with slits or lancing of the packing there are many downward facing surfaces, and few prior art designs effectively address proper coverage of the surface by the heavy phase or light phase passage therethrough. This is true even with a plurality of apertures disposed in corrugated and/or cross-fluted plates in face-to-face contact such as those described above. Light phase flow is sensitive to pressure differentials, and is easily diverted between the many exposed areas of the packing.

It is desirable, in countercurrent flow, that both the liquid and the vapor effectively commingle along uniformly wetted packing surfaces. In order for this to occur, it has been shown to be very beneficial for both the liquid and the vapor to be able to pass through the corrugated sheet for effective interaction. Without the free passage of both vapor and liquid through the sandwiched corrugated sheets, zones of either high or low volume flow can occur. These flow volume differentials result in a lack of uniformity and homogeneity within the packing. The most efficient structured packing configuration incorporates a region wherein the ratios of vapor and liquid remain relatively constant with consistent interaction and mixing. This requires a packing surface facilitating uniform flow of both liquid and vapor through both sides of the corrugated sheets, yet in a configuration promoting uniform wetting and spreading of liquid and equalization of pressure between said sheets. Similar considerations apply in liquid-liquid extraction applications. Thus, in countercurrent flow in liquid-liquid systems, both phases should effectively commingle along uniformly covered packing surfaces. In order for this to occur, it is very beneficial for both the light and heavy phases to be able to pass through the corrugated sheet for effective interaction. Without the free passage of both phases through the sandwiched corrugated sheets, zones of either high or low volume flow can occur. These flow volume differentials result in a lack of uniformity and homogeneity within the packing. The most efficient structured packing configuration incorporates a region wherein the ratios of light and heavy phases remain relatively constant with consistent interaction and mixing. This is best achieved with a packing surface that promotes uniform flow of both phases through both sides of the corrugated sheets, while also promoting uniform spreading of the liquids and equalization of the pressure between said sheets.

It would be an advantage, therefore, to overcome the problems of the prior art by utilizing the flow directing and gathering features of louvers constructed in the corrugated plates. The methods and apparatus of the present invention provide such an improvement over the prior art packing by providing a corrugated plate having a select louver configuration therein. In this manner, liquid is caused to flow upon and through both sides of the corrugations of facing plates in paths which substantially increase the vapor-liquid or liquid-liquid contact of ascending vapor (or liquid) and descending liquid normally passing between said corrugated plates. The presence of selectively oriented arrays of louvers in the corrugated sheets permits vapor (or light liquid) and liquid flows to be exposed on opposite sides thereof while flowing in opposed directions thereacross. Such liquid-vapor (or liquid-liquid) flow configurations maximize mass transfer efficiency and may be provided with a minimal increase in production costs over that of conventional opposed plate corrugation assemblies.

SUMMARY OF THE INVENTION

The present invention relates to vapor-liquid and liquid-liquid contact towers and structured packing arrays disposed therein for affording contact between the phases passed therethrough. More particularly, one aspect of the present invention comprises an improved tower packing of the type comprising a plurality of corrugated sheets in face-to-face contact with opposed corrugations inclined oppositely one to the other. The packing is adapted for receiving a first mobile phase moving in a first stream concomitantly with a second mobile phase moving in a second stream. The improvement comprises an array of oppositely oriented louvers formed in common flat areas of the corrugated sheets, the louvers being angled to pass said first and second mobile phases through the flat areas of the sheets in opposite directions.

In another aspect, the invention includes a tower packing for contacting a vapor stream with a liquid stream or contacting two liquid streams, the packing comprising vertically oriented corrugated sheets in face to face contact. Each of the sheets has fold lines therein establishing ridges and valleys separated by flat areas. The ridges, valleys, and flat areas define the corrugated configuration of the sheets. The flat areas are provided with a plurality of laterally extending louvers, and substantially all of the louvers terminate adjacent but short of the fold lines. The louvers have some upwardly facing edges and some downwardly facing edges. Some of the louvers project transversely outwardly from the respective planes of the flat areas and some of the louvers project transversely inwardly from the respective planes of the flat areas.

In yet another aspect, the invention described above further includes a tower packing in which at least some openings through the corrugated sheets are defined by an outwardly projecting louver on one side thereof and an inwardly projecting louver on an opposed side thereof. The louvers may be arranged in laterally aligned pairs across the flat areas, and the louvers of the laterally aligned pairs may have their respective edges oriented in the same vertical direction, extending in the same transverse direction from the respective plane of the flat areas.

BRIEF DESCRIPTION OF THE DRAWINGS

For a more complete understanding of the present invention and for further objects and advantages thereof, reference may now be had to the following description taken in conjunction with the accompanying drawings in which:

FIG. 8 is an enlarged side elevational, cross-sectional view of the corrugated plate of FIG. 4 taken along lines 7—7 thereof and illustrating the flow of fluids therethrough;

FIG. 9 is a graph charting the performance of the packing of the present invention for various tower pressures;

FIG. 10 is a graph charting the performance of the packing of the present invention relative to other structured packing at a selected tower pressure;

FIG. 11 is a graph charting the performance of the packing of the present invention relative to other structured packing at a second tower pressure;

FIG. 12 is a graph charting the performance of the structured packing of the present invention relative to other structured packing at a third tower pressure;

DETAILED DESCRIPTION

In this description, the invention is discussed both in the context of vapor-liquid contact packing, and in the context of multi-phase liquid systems.

Figure 1:
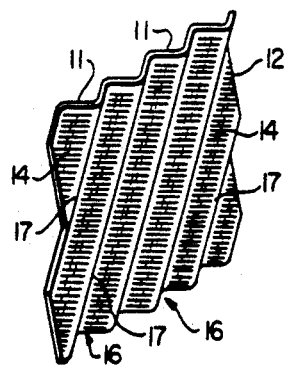
FIG. 1 is a perspective view of a corrugated plate adapted for vapor-liquid or liquid-liquid contact and having louvers formed therein in accordance with the principles of the present invention.

Referring first to FIG. 1, there is shown a perspective view of a phase contact plate 12 constructed in accordance with the principles of the present invention for use in a process tower to be described below. The plate 12 comprises a relatively thin corrugated sheet formed from stainless steel, or the like, and having a series of louvers 14 formed therethrough. Thin corrugated sheets of this general type are conventionally used for vapor-liquid or liquid-liquid contact plates. Each louver 14 is formed in the generally flat or planar side will 11 of the corrugation and, as described below, said louvers are formed in laterally aligned pairs, the ends of which extend to, but not through, the corrugation valleys and ridges. Each louver is also formed with a "companion" louver adjacent thereto for providing an enlarged space therebetween for vapor and liquid passage through plate 12. Vapor and liquid or, alternately, light and heavy liquids are then induced to flow in opposite directions along such louver regions and through the plate 12 for effecting mass and heat transfer, as discussed in more detail below. The manner in which the vapor and liquid or light and heavy liquids flow is directed upon, through, and between respective plates 12 directly affects the efficiency of the tower operation and forms the subject of the present invention.

Still referring to FIG. 1, the plate 12 comprises a crimped or corrugated member having a plurality of flow channels 16 defined between adjacent side walls 11 and within the respective corrugation ridges 17 disposed thereacross. The corrugated plates 12 are adapted for positioning in face-to-face relationship, wherein the louvers 14 induce the passage of vapor and liquid or light and heavy liquid through the plate 12. The flow of the fluids through the plates 12 minimizes maldistribution of the fluid constituents within the structured packing of the tower under various operating conditions that will be discussed below.

Figure 2:
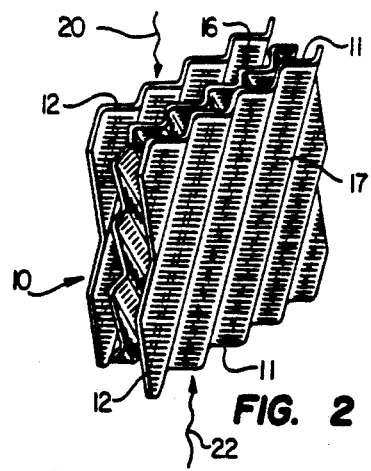
FIG. 2 is a perspective view of a plurality of the corrugated plates of FIG. 1 in an assembled configuration.

Referring now to FIG. 2, there is shown a perspective view of a partial assembly of structured packing 10 of plates 12. The structured packing assembly 10 as shown herein comprises only a portion of a structured packing layer for use in a process tower. A large number of plates 12 would ordinarily be used to define a single layer, any part of which would appear similar to that shown in FIG. 2. In the assembled configuration, the plates 12 are disposed in face-to-face relationship with their corrugation angles oppositely disposed. A plurality of discrete flow channels 16 are formed within the packing 10 as defined by the contiguous plates 12. The respective flow channels 16 defined between the corrugation ridges 17 of each plate 12 are best seen in the top plan view of FIG. 3.

Still referring to FIG. 2, it may be seen that the heavy liquid 20 descending through the packing assembly 10 will engage the vapor or light liquid 22 ascending through said packing resulting in interaction therebetween. Heavy liquid 20 descending along each plate 12 is optimally spread across both sides of the corrugation channel 16 and will also pass through the louvered surfaces thereof. The vapor or light liquid 22 rising between plates 12 may likewise pass along and through the respective plates by virtue of the louvers 14 therein. The orientation of the louvers 14, as described in more detail below, will affect the volume and flow pattern of vapor or light liquid deflected therethrough.

Figure 3:
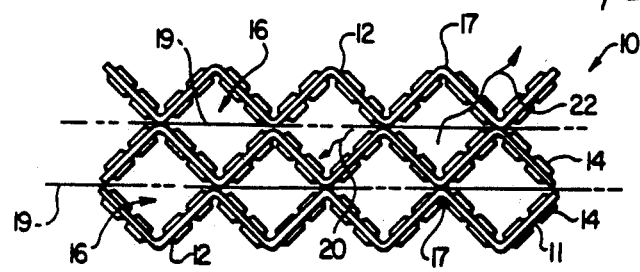
FIG. 3 is an enlarged top plan view of the assembled contact plates of FIG. 2.

Referring now to FIG. 3, there is shown a top plan view of the assembly 10 of FIG. 2 wherein the plates 12 are assembled in face-to-face relationship. In this abutting engagement, a notional plane 19 is defined between the contiguous ridges 17 of adjacent plates 12. In this manner, ridges 17 of adjacent plates 12 contact each other along the notional plane 19, which is represented in phantom in the present illustration. In some prior art structured packing, a lamella discretely separates the adjacent corrugated plates 12 by being placed in the notional plane 19. This physical separation across the notional plane affords defined fluid flow as set forth and described in U.S. Pat. No. 4,597,916, assigned to the assignee of the present invention and incorporated herein by reference. In the present construction, no lamella is provided along the notional plane which separates the plates 12 one from the other. Such a plate is not considered necessary because of the enhanced vapor-liquid or liquid-liquid flow along and through the plates 12, as provided by the louvered configuration herein described.

Referring now to FIGS. 2 and 3 in combination, heavy liquid 20 descending through the packing 10 flows upon and between the adjacent plates 12 as vapor or light liquid 22 ascends upwardly therethrough. One or more components are mass-transferred from one phase to another. The louvers 14 in surface 11 will vector the flow of both phases through the plates 12 for uniform interaction therebetween. As shown most clearly in FIG. 3, the ascending light phase 22 will rise upwardly through the channels 16 defined between the plates 12. Concomitantly, the heavy phase 20 will descend generally along both sides of the plates while engaging the ascending light phase 22 rising therein. The presence of louvers 14 will directly affect both the descending heavy phase 20 and ascending light phase 22 by forcing said constituents into direct contact one with the other and by forcing said constituents to pass through the respective plates 12 in which the louvers 14 are formed.

Figure 4:
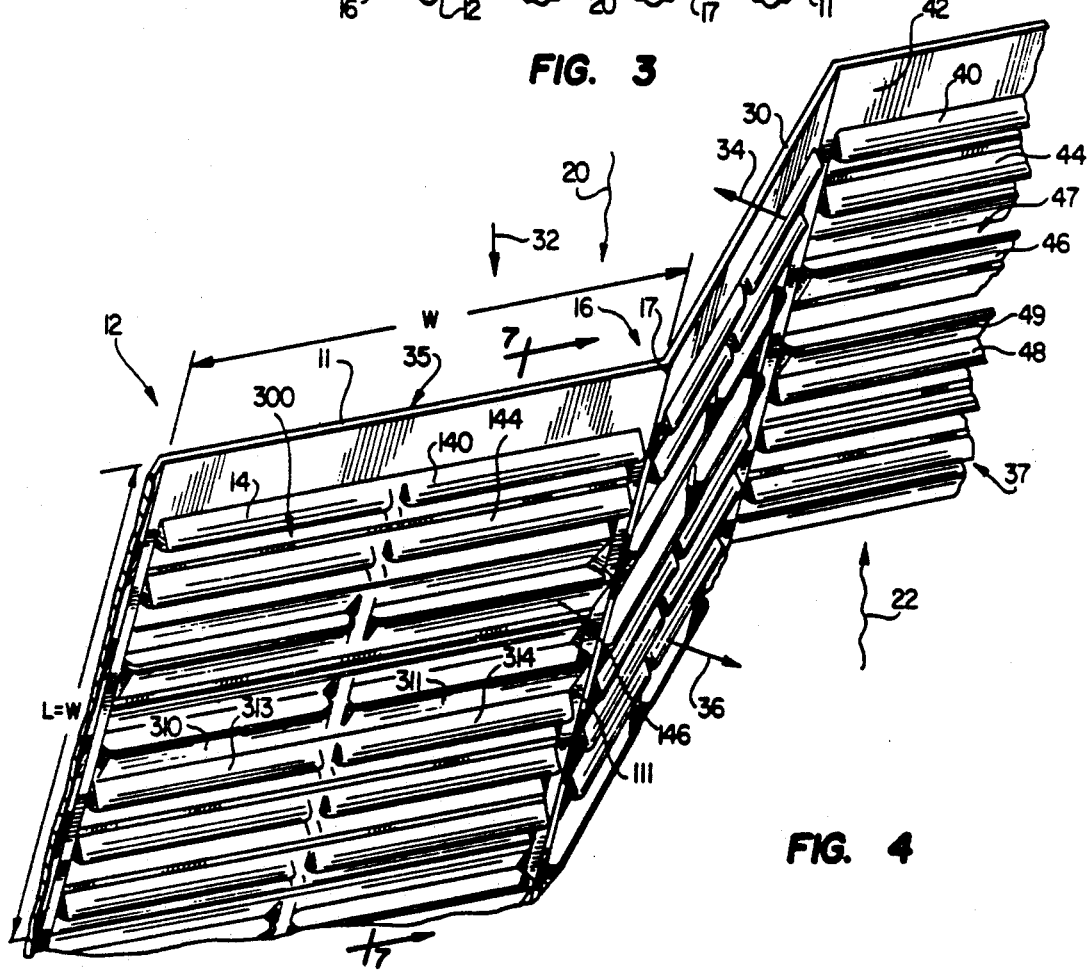
FIG. 4 is an enlarged, fragmentary, perspective view of the corrugated plate of FIG. 1 illustrating the louvers formed therein.

Referring now to FIG. 4, an enlarged, fragmentary, perspective view of a section of the plate 12 of FIG. 1 is shown. The plate 12 includes corrugation ridges 17 defining flow passages 16 (as seen in FIG. 2) therebetween. The plate 12 further includes a plurality of louvers 14 defining a series of directional flow openings therethrough. The louvers 14 are formed in a present pattern in this particular embodiment. The formation of the respective louvers 14 is comprised of a number of parameters, and the discussion of said parameters requires a series of terms for purposes of discussion therewith. The following terms are utilized herein for purposes of discussing the louver configuration as shown in FIG. 4 and subsequent drawings. Each flat area 11 has a corrugation width "W" that is equal to the distance between adjacent folds, or ridges of the corrugation. For reference purposes, a length "L", taken at a right angle from "W" along the flat area which is equal to the corrugation width "W" will be used to define a unit area (LXW) that is referred to as a "square corrugation unit". For example, a corrugation width W of 0.75 inches would mean that a length L down the corrugation flat area of 0.75 inches would define a "square corrugation unit". In this example, the square corrugation unit area is 0.5625 square inches. The reference to "square corrugation unit" will be used herein for purposes of defining the number of louvers 14 from a density standpoint.

Additional terms used herein may be based upon the bottom and top of plate 12 of FIG. 4. The top edge 30 will be considered the uppermost reference surface and the direction of arrow 32 will be considered "downward" therefrom. Arrow 34 represents the direction through the plate 12 which will be termed "inward" or "inwardly" hereinafter and number 35 will thus designate the "inward" surface. Arrow 36 represents the direction through the plate "outwardly" thereof; and number 37 will thus represent the "outward" surface. Each louver is formed adjacent to an oppositely disposed "companion" louver which also extends from the opposite surface of the plate 12 to define an enlarged opening or space therebetween and through the plate 12. Also, each louver is formed with a "juxtaposed" louver adjacent thereto and extending from a common land area of plate 12. Each juxtaposed louver pair comprises oppositely oriented louvers which may project from the same or opposite surfaces of the plate 12 as discussed in FIG. 7.

Utilizing the parameters above discussed and still referring to FIG. 4, uppermost louver 40 of surface 37 of flat plate section 42 faces downwardly and outwardly. Louver 44 disposed therebeneath and also extending from surface 37, faces downwardly and outwardly. Below louvers 40 and 44 a series of louvers are formed in surface 37, which louvers face upwardly and outwardly. Louver 46, extending from surface 37, faces upwardly and outwardly to form opening 47 through the plate 12. As discussed above and as seen most clearly in FIG. 7 below, each aperture such as opening 47 formed by a louver 14 is the product of two oppositely disposed companion louvers extending from opposite surfaces of the plate 12. Opening 47 is formed not only by the louver 46 extending upwardly and outwardly from side 37 but also from a louver (not shown) adjacent louver 46 formed along inside surface 35 of plate 12 extending downwardly and inwardly therefrom. The size of the opening 47 is thus the product of the pair of companion louvers formed on opposite sides of the plate. References may be made to a single louver on a single side of the plate 12, but the louver aperture associated therewith is also the result of a companion louver formed on the opposite side of said plate. For example, although louver 44 is said to be disposed beneath louver 40, it should be understood that the discussion is addressing surface 37 of flat plate section 42 and that at least one upwardly inwardly deflected louver is formed on the opposite surface 35, disposed between louvers 40 and 44, as shown in more detail in FIG. 7 below. A discussion of a pattern of large and small louvers in a plate 12 is set forth in U.S. patent application Ser. No. 07/747,184, filed on even date herewith by the same inventors, assigned to the assignee of the present invention, and incorporated herein by reference for all intent and purposes.

The construction of the louvers 14 within the plate 12 (see FIG. 3) provides a myriad of advantages to fluid flow therealong. Liquid 20 descending downwardly upon the plate 12 will engage the louvers 14 facing upwardly causing the deflection of the heavy liquid through the plate. This deflection may be in either an inward or outward direction as viewed in FIG. 4, depending upon the surface from which the louver upstands. If the heavy liquid does not migrate through the plate 12 via a particular louver, it may find a path of migration through said plate by virtue of a second or third louver disposed above or below having the same orientation. It may be seen that the pattern of louvers in the present embodiment of the invention includes at least two adjacent louvers on one side of the plate 12 having identical orientations, disposed adjacent louvers having opposite orientations. The actual pattern will be discussed in more detail below.

Still referring to FIG. 4, the ascending vapor or light liquid 22 will likewise find itself engaged by downwardly extending louvers such as louver 48 which will capture and redirect portions of ascending flow therethrough. The ascending vapor or light liquid flow passing upwardly through louver 48 will directly engage descending heavy liquid flow captured by upper louver 49, disposed immediately thereabove, for enhancing the vapor-liquid or liquid-liquid contact therebetween. Not only is the heavy liquid directly forced into engagement with the vapor or light liquid, but the phases are permitted to flow through the plate 12 for proper pressure and flow equalization.

Figure 5:
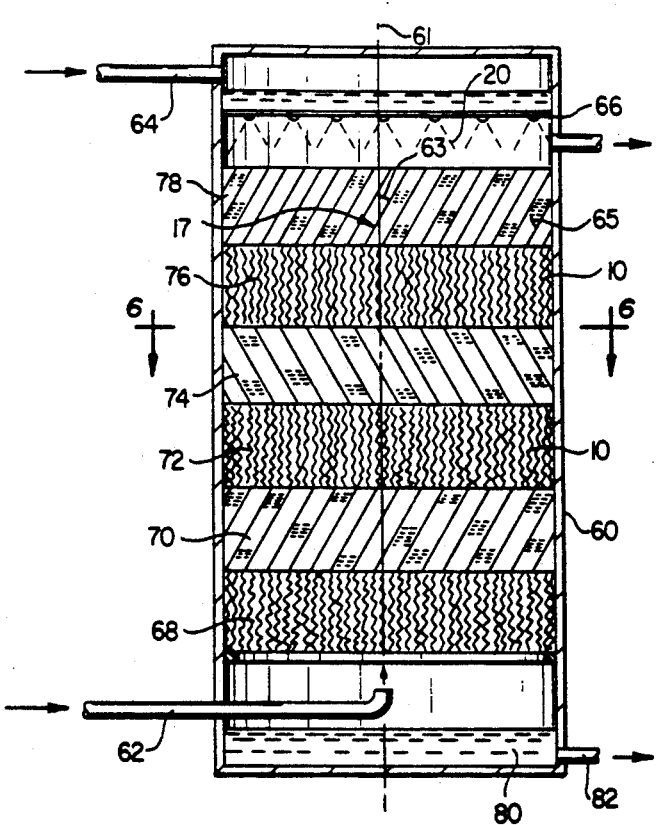
FIG. 5 is a side elevational, cross-sectional view of a process tower having stacked therein a plurality of layers of the assembled plates illustrated in FIG. 2 and incorporating one embodiment of the method and apparatus of the present invention.

Referring now to FIG. 5, there is diagrammatically shown a process tower 60 stacked with layers of structured packing 10 constructed in accordance with the principles of the present invention. The tower 60 includes a lower vapor feed line 62 and an upper liquid feed line 64. Liquid 20 is dispersed across a distributor 66 for passage downwardly through the structured packing disposed therebeneath. The tower 60 further includes a central axis 61, shown in phantom. It may be seen that the corrugation ridges 17 (FIG. 1) form an angle 63 relative to the tower axis 61. Angle 63 is thus the acute angle which the ridge 17 forms. It may also be seen that the louvers 14 of this particular embodiment are formed orthogonally to the tower axis 61 and themselves form an acute angle 65 relative to the corrugation ridge 17. In accordance with this embodiment of the present invention, the sum of angles 63 and 65 is approximately 90°.

Still referring to FIG. 5, a lower level 68 of structured packing is disposed immediately above the vapor supply line 62. Above layer 68 is a second layer of packing 70 which is rotated relative to layer 68. The angular rotation is typical in the placement of structured packing beds in process and may be in the range of 45° to 90°, and a variety of angles could be used. Layer 72 is thus disposed at an angle to layer 70 with layer 74 rotated relative thereto. Upper layer 76 is disposed beneath top layer 78 which is disposed beneath the liquid discharge distributor 66. Liquid 20 is shown discharged from distributor 66, which liquid collects in lower reservoir 80 at the bottom of the column 60 where it is discharged through discharge pipe 82. In this typical diagrammatic illustration of structured tower packing, it may be seen that the liquid flows in direct countercurrent flow relative to the vapor for interaction and mass transfer therewith.

Figure 6:
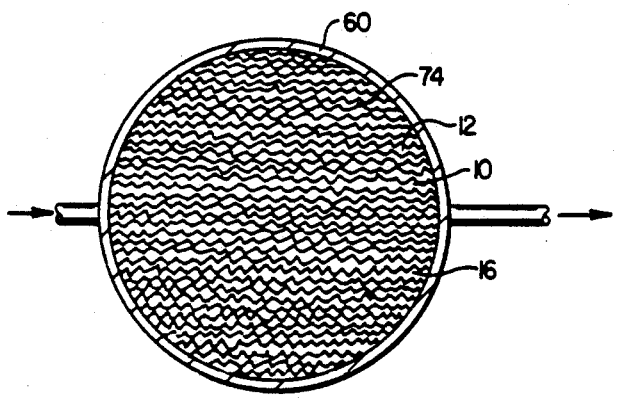
FIG. 6 is a top plan, cross-sectional view of the process tower of FIG. 5 taken along lines 6—6 thereof.

Referring now to FIG. 6, there is shown a top plan view of the structured packing layer 74 of FIG. 5 taken along lines 6—6 thereof. The packing 74 is diagrammatically shown to comprise a series of corrugated plates 12 aligned in a generally parallel spaced relationship in the manner discussed above. It may be seen that the array of plates 12 form an intricate section of flow channels 16 therebetween. The uniform countercurrent flow of vapor and liquid therein can prevent a number of problems from occurring, and the present invention addresses such considerations.

Figure 7:
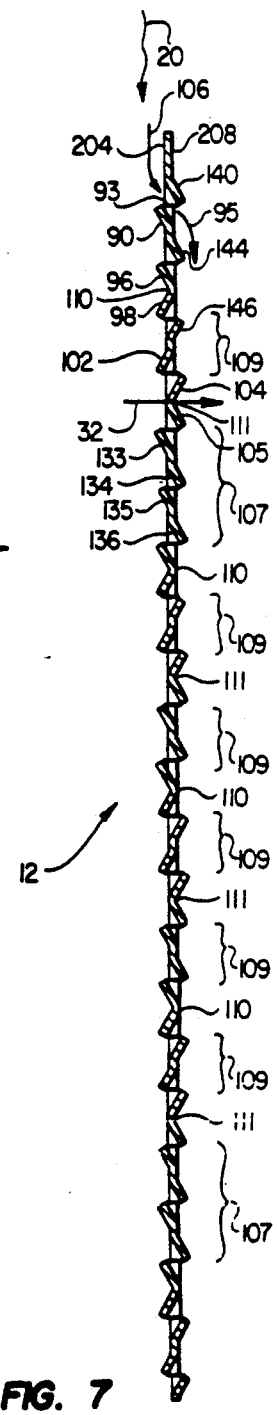
FIG. 7 is an enlarged side elevational, cross-sectional view of the corrugated plate of FIG. 4 taken along lines 7—7 thereof.

Referring now to FIG. 7, there is shown an enlarged, side elevational, cross-sectional view of a section of the plate 12 of FIG. 4 illustrating the louvered configuration thereof. The louvers 14 of FIG. 4 have been sequentially numbered to generally correspond to the previous numbering of the louvers in FIG. 4 and their position along section 42. The louvers 14 are seen to extend from inside plate surface 204 and outside plate surface 208, from which directional references will be taken. Louver 140 is thus seen as the counterpart of louver 40 (FIG. 4), extending downwardly and outwardly from surface 208. Louvers 140, 144 and 146 are shown in FIG. 4 for reference purposes.

Still referring to FIG. 7, the flow of liquid 20 is shown in the direction of arrow 106, which flow is downwardly and outwardly beneath louver 140 in the general direction of arrow 32. Immediately beneath louver 140 on surface 204 is "companion" louver 90 facing upwardly and inwardly. The aperture 93, defined as that opening between oppositely oriented companion louvers 90 and 140 (one facing inwardly, one facing outwardly), will form a larger opening than any single small louver 14 could form by itself relative to the plate 12. Louver 90 thus faces upwardly in association with louver 140 to define aperture 93, which aperture engages descending liquid flow 106 for vectoring said liquid flow outwardly therethrough in the direction of arrow 95. It has been demonstrated that upwardly deflecting louvers engage and directly deflect the downward flow of heavy liquid 20 therethrough, forcing said this liquid to pass through the plate 12.

Still referring to FIG. 7, beneath louver 90 is "juxtaposed" louver 144, which louver is angled downwardly and outwardly. Below louver 144 is companion louver 96, which faces inwardly and upwardly. Louver 98, juxtaposed beneath louver 96 and formed from common, inwardly opening V-shaped louver section 110 faces downwardly and inwardly. Louver 146 faces upwardly and outwardly and is juxtaposed with lower louver 102, which faces downwardly and inwardly. Louver 104 forms a companion to louver 102 and faces outwardly and upwardly. Louver 104 and louver 105 are formed from a common, outwardly opening, V-shaped louver section 111. It may be seen that any heavy liquid passing downwardly over the outward surface of the louver 146 could be engaged by the upward opening of louver 104 and be deflected therethrough. Heavy liquid which is not deflected through louver 104 will pass downwardly across the upper and outer surface 208 of the next group of louvers 14, which extend outwardly and are oriented downwardly. The louver group 107 formed of companion louvers 14 extending from opposite sides 204 and 208 of plate 12 may be seen to be larger than upper louver group 109 which only incorporates juxtaposed louvers 146 and 102, above discussed. Each louver group 107 incorporates four juxtaposed louvers which are numbered for reference purposes as louvers 133, 134, 135 and 136. Between each grouping of louvers 107 and 109 there is disposed either generally V-shaped louver section 110 or 111. The V-shaped louver sections 110 and 111 are alternately oriented and disposed between said louver groups. The V-shaped sections opening or facing outwardly are designated as louver sections 111 while the inwardly facing sections are designated as louver sections 110. It may be seen in the current pattern that five groups of juxtaposed louvers 109 are generally disposed between each louver group 107. This particular array is provided for purposes of illustration only. A large variety of patterns and arrays of louvers 14 could be constructed in accordance with the principles of the present invention. This particular pattern has been found to provide a louver pattern which is structurally sound relative to the plate 12.

Referring now to FIG. 8, there is shown the same view of the plate section of FIG. 7 illustrating, in more detail, one pattern of the passage of light and heavy phases therethrough. Each of the various louvers are not separately numbered in this view for purposes of facilitating a discussion of the fluid flow pattern therein. Descending heavy liquid 20 is thus shown to form a split stream 201 and 202 as it encounters first companion louvers 90 and 140, with louver 90 projecting from side 204. The stream 202 is vectored downwardly and outwardly under louver 140, causing it to pass to the outside surface 208 of plate 12. Along the inside surface 204, the remaining heavy liquid 201 is permitted to continue downwardly. In this pattern, it may continue downwardly or flow through louver 96 to the outside surface 208 of plate 12 as indicated by flow arrow 210. The volume of fluid 210 vectored through the louvers such as louver 96, will depend upon a number of parameters including the type of liquids, flow rate, the louver size, and the configuration of ascending vapor or light phase flow 22. It may be seen that the size of the opening for the louver 90 is finite, and once the maximum flow therethrough is achieved, additional liquid will simply flow past the louver.

Still referring to FIG. 8, the heavy liquid flow 201 may continue downwardly along the inside surface 204 below louver 96 to egress through louver 105 as labeled stream 212. A wide variety of flow configurations would, of course, be possible, and these are presented for purposes of illustration only. The accumulation of fluid flow streams 202 and 210 may likewise continue downwardly along the outside surface 208, or a portion thereof may be vectored back through the louver 104 as shown by flow arrow 216. In that configuration, the flow 216 will then flow downwardly along plate surface 204 and accumulate with remaining flow 201 from above. At this point the heavy liquid which began as heavy liquid flow 20 may have passed through the plate twice; having been exposed to ascending vapor or light liquid flow 22 on both sides of the plate 12. As stated above, the designation of the louver through which the flow passes clearly depends on the point of reference of the observer. Heavy liquid stream 216 actually passes between louvers 102 and 104 because the space therebetween is formed as a result of said louvers in combination. References to flow through a single louver are to be viewed as a reference to flow through that louver and the adjacent louver forming the flow aperture therebetween.

Referring still to FIG. 8, the descending heavy liquid flow 20 meets the ascending vapor or light liquid flow 22 along the plate 12. The ascending vapor or light flow is vectored through the plate 12 by the downwardly extending louvers which present an exposed louver edge thereto. The louvers are sized to present a sufficient surface area for engaging and vectoring vapor or light liquid flow through the plate 12. However, there may be a volume of heavy liquid passing through a particular louver which would block and/or prevent the ascending flow of vapor or light liquid therethrough. It is for this reason that ascending flow 22 is not shown passing through certain louvers such as louvers 102 and 140 where heavy liquid flow is already present. Arrow 221 indicates the passage of vapor or light liquid through louver 222 as arrow 223 indicates the passage of vapor or light liquid through louver 224. Arrow 221 is shown oppositely disposed to arrow 201, indicating the countercurrent flow of light and heavy phases along this area of the inside surface 204 of plate 12. The pattern of louvers is provided for maximizing the potential of phase contact and thus vertically adjacent louver groups 107 and 109 are oppositely oriented, as shown in FIG. 7. Additionally, it is thought that vapor or light liquid may pass upwardly through one set of louvers while heavy liquid passes downwardly through an adjacent set. The actual distribution of light and heavy phases through the plate 12 may vary depending on the particular application, viscosity, specific grants, surface tension, and liquid volumes, vapor pressure (in the case of a vapor), and other operating parameters. An example of this varied interaction could include a descending heavy liquid flow as indicated by arrow 290 of FIG. 8, opposite a louver 291 wherein a vapor or light liquid flow 292 is occurring immediately therebeneath between louvers 293 and 294. Obviously, this countercurrent flow of vapor-liquid or liquid-liquid phases through the plate 12 would further enhance the intimate interaction between said phases. The mixing area 295 on side 204 of plate 12 would thus see close interaction between the ascending and the descending phases as would the area 296 on side 208 of plate 12. Such a specific interaction may not always occur between adjacent louvered pairs, but could occur between adjacent groups of louvers 107 and 109 (FIG. 7). The combinations are too plentiful to discuss in detail and it is not necessary that any specific combination, other than that shown, be established as preferred, according to the present understanding of the invention.

Referring back to FIGS. 4 and 7, the louvers 14 are constructed in a predefined pattern of select orientation. The patterns may, of course, vary for particular applications. The particular pattern 300, as shown herein, comprises first and second laterally disposed louvers 14, constructed in a density on the order of at least eight slotted open areas per square corrugation unit. The louvers 14 are arranged in the groups 107 and 109, as described above, and the lateral spacing provides structural integrity. The width of the louvers may vary, but in the present embodiment each louver has a width on the order of 45% of the width of the flat area 11. The laterally aligned pair of louvers terminate adjacent to, but short of, the fold lines 17.

Still referring to FIG. 4, louvers 310 and 311 are formed side by side, which louvers 310 and 311 are upwardly and outwardly deflected. Louvers 313 and 314 are disposed beneath louvers 310 and 311, respectively, and are likewise formed outwardly and downwardly. Together they form the generally V-shaped louver section 111. It may be seen that each of the louvers 14 extend laterally within the flat areas between the ridges and valleys of each corrugated plate 12 and substantially all of the louvers terminate adjacent, but short of, the fold lines. This lateral size aspect of each louver is specifically shown in FIG. 4. Although the terminology of upwardly and downwardly deflected louvers has been used herein, other nomenclature can be used. For example, it may be said that the louvers have edges which face upwardly or downwardly. The louvers may also include some edges that project transversely outwardly from the respective plane of the flat areas of the plate 12 and some that project transversely inwardly from the respective planes of the flat areas of said plates. The openings between the louvers may also be defined by an outwardly projecting louver on one side of the plate and an inwardly projecting louver on the opposite side of the plate 12.

Referring now to FIGS. 9 through 12, there are shown graphs of the test results indicating performance characteristics of structured packing at various operational conditions. FIG. 9 addresses the performance of structured packing 10 constructed in accordance with the principles of the present invention and assembled in a test column diagrammatically similar to that illustrated in FIG. 5 for measuring the efficiency thereof. Also in this graph, the performance of the structured packing 10 in a cyclohexane/n-heptane system is charted for three tower pressure ranges, to-wit: 4.8 psia, 24 psia and 60 psia. The performance is reflected in HETP inches appearing along the ordinate of the chart. The abscissa of the chart references the "F" factor, which is a common parameter in tower design. The "F" factor is the product of the superficial vapor velocity ($V_S$) across a tower cross section and the square root of vapor density ($D_V$), and it may be represented by the following formula: $F = V_S(D_V)^{\frac{1}{2}}$ As indicated by the chart of FIG. 9, the efficiency of the packing decreases (a higher HETP) with an increase in pressure from 4.8 psia to 24 psia. However, the graph indicates that the increase in pressure from 24 psia to 60 psia is effectively accommodated by the louvered configuration above described and the performance characteristics actually improve to the HETP level of the 4.8 psia range.

Referring now to FIG. 10, there is shown a graph comparing the structured packing 10 of the present invention to another structured packing configuration using the same system referred to above. The structured packing of comparison is that set forth and shown in U.S. Pat. No. 4,604,247 (hereinafter referred to as the "'247 packing"). The relative performances of these packings are again charted with HETP appearing along the ordinate and the F-factor along the abscissa. As seen in FIG. 10, the packing 10 of the present invention has an improved performance in comparison to the '247 structured packing. This performance curve is generated at a relatively low tower pressure of 4.83 psia.

Referring now to FIG. 11, there is shown the same chart as FIG. 10 and the comparison of the same structured packing and system therein. In this illustration, the above-referenced packings are measured at a tower pressure of 24 psia. The tower packing 10 of the present invention has a better performance curve than the '247 packing for F factors above about 1.5. It is thought that the presence of the louvers, as well as their constructional configuration, improves the vapor passage and homogeneity of vapor flow at the higher F factor values. Referring now to FIG. 12, there is shown the charted performances of the above-referenced packing at a tower pressure of 60 psia. Again, the packing 10 of the present invention performs better than the '247 packing for F factors above about 1.5.

In operation, the flow of liquid downwardly across the plate 12 is effectively improved relative to many prior art plate designs. Unlike smooth plates, the liquid is not given a chance to accumulate in the valleys formed by ridges 17 (FIG. 4) due to the spacing of the louvers. As seen in the drawings, the edges of the louvers are disposed along the borders of the trough, whereby any fluid accumulation therein is effectively diverted by the presence of the louver. Likewise, each pair of louvers 14 includes segmented louver regions. Due to the size of the small louvers, they are formed in segments relative to the width of the flat area 11 and wherein the length of each small louver is approximately one-half the length of the flat area. This construction provides the structural rigidity necessary for the tower packing. The construction shown herein also lends itself to symmetry in fabrication, which symmetry may contribute to the effectiveness of the performance data discussed herein.

Liquid-liquid operations involving multi-phase systems are illustrative of the use of packing of the present invention in an all-liquid system. In such operations the two liquids differ somewhat in specific gravity and are partly or totally immiscible. The lighter of the two liquids fills the role of the vapor in a vapor-liquid tower; it is introduced into the bottom of the tower and flows upwardly through the packing past the downwardly flowing heavier liquid, which is introduced at the top of the tower. A component or components of interest located in the liquids move or tend to move into the liquid in which they are preferentially soluble, across a phase boundary, if necessary. In this way the component(s) is extracted from the liquid in which it is less soluble into the one in which it is more soluble.

Another type of liquid-liquid operation may involve liquids which are mutually soluble or which easily emulsify. In this case the packing acts as a static mixer, and the liquids are preferably passed through it in co-current flow.

Figure 13:
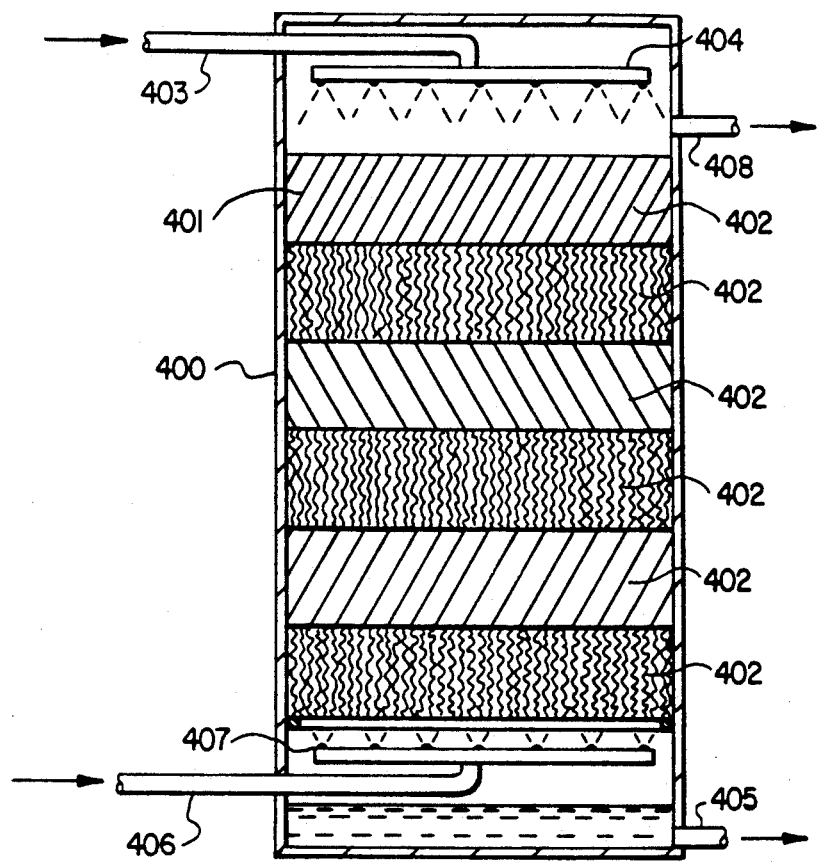
FIG. 13 is a side elevational cross-sectional view of a process tower having stacked therein a plurality of layers of the assembled plates illustrated in FIG. 2 and incorporating another embodiment of the method and apparatus of the present invention, the tower being arranged for liquid-liquid operation and the view otherwise being similar to FIG. 5.

FIG. 13 illustrates somewhat diagrammatically a tower 400 arranged for liquid-liquid countercurrent service. It is in many respects similar to the vapor-liquid tower shown in FIG. 5. Tower 400 is packed with the structural packing of the invention 401, arranged in layers 402 which are preferably rotated 90° with respect to their neighbors. A heavy liquid introduction line 403 leads to heavy liquid distributor 404. At the bottom of the tower is heavy liquid withdrawal line 405 through which heavy liquid is withdrawn from the tower. A light liquid introduction line 406 terminates in a light liquid distributor 407 through which light liquid is delivered into the bottom of the tower. A light liquid take-off line 408 is provided near the top of the tower for removal of light liquid.

In operation, light liquid is introduced into the bottom of the tower through line 406, and heavy liquid is introduced through line 403. The heavy liquid flows downwardly through the layers 402 of the packing of the invention, and the light liquid flows upwardly through the layers 402 of the packing of the invention. In doing so, the two liquids come into intimate contact and mass and heat exchange occurs between them. The detailed flow mechanisms are discussed herein above.

In tower 400, the main interface between the light and heavy liquids may be either near the top of the tower or near the bottom. In FIG. 13, the interface 409 is shown near the bottom. When the interface is near the bottom of the tower, the continuous phase within the tower is light liquid. When the interface is near the top of the tower, the continuous phase is the heavy liquid.

Figure 14:
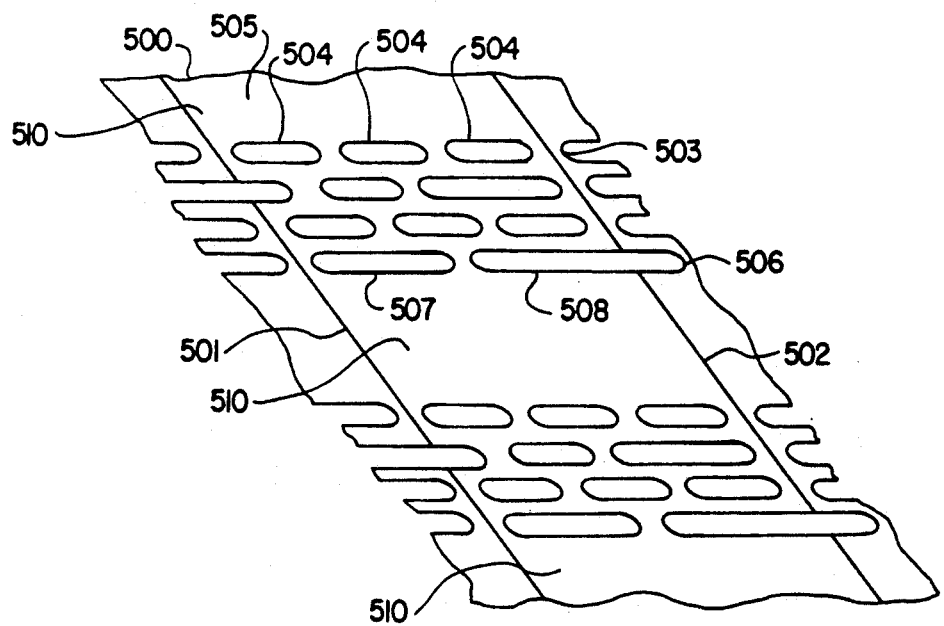
FIG. 14 is a fragmentary somewhat diagrammatic plan view of a corrugated plate of another embodiment of the present invention.

FIG. 14 illustrates in fragmentary and diagrammatic form an alternate packing structure constructed in accordance with the invention. In FIG. 14, packing 500 is shown, with corrugation fold lines indicated at 501 and 502. The louvers are shown in FIG. 14 as simple oblongs, it being understood that their detailed structure is as discussed above at some length. FIG. 14 shows eight rows of louvers, and also areas 510 which are free of louvers. Row 503 contains three louvers 504 per flat area 505 of the packing between corrugation lines. Row 506, by contrast, contains two louvers 507 and 508. Thus, there is illustrated the principle that different rows of louvers may contain different numbers of louvers, and that the length of the louvers may vary from row to row, and within rows.

Another aspect of the invention is illustrated in row 506 of packing 500 in FIG. 14. In that row, louver 508 extends from flat 505 area across corrugation fold line 502 and onto adjacent flat area 509. By crossing the fold line 502, louver 508 is positioned to intercept liquid moving in either direction along the fold line, and on either side of the sheet. In some applications, this construction may be preferred.

Figure 15:
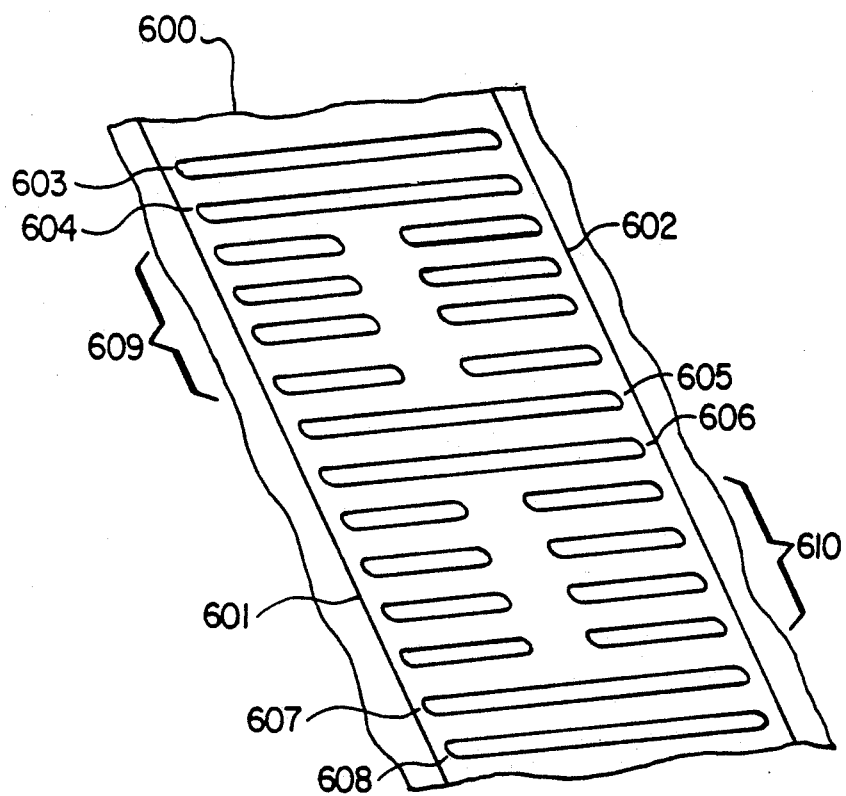
FIG. 15 is a framentary somewhat diagrammatic plan view of a corrugated plate of still another embodiment of the invention.

FIG. 15 shows in fragmentary and diagrammatic form another alternate packing structure constructed in accordance with the invention. In FIG. 15, packing 600 is shown, with corrugation fold lines indicated at 601 and 602. As was the case in FIG. 14, the louvers in FIG. 15 are shown as simple oblongs, it being understood that their detailed structure is as discussed above at some length. FIG. 15 shows fourteen rows of louvers. Rows 603, 604 and 605, 606, together with 607, 608 each comprise a single long louver, preferably extending over a large portion of the width of the flat area lying corrugation fold lines 601 and 602. Although these louvers are long compared to louvers in other rows, they are preferably otherwise dimensioned substantially the same as the shorter louvers. The rows of shorter louvers are grouped in sets of four rows, as at 609, 610. Each row contains two louvers of substantially equal length aligned end to end with a space between the ends. The arrangement shown in FIG. 15 may be advantageous in some applications because the long louvers in rows 603, etc., will tend to break up and disrupt any liquid stream which may tend to course downwardly through the space between short louvers in row sets 609, 610.

It is thus believed that the operation and construction of the present invention will be apparent from the foregoing description. While the method and apparatus shown and described have been characterized as being preferred, it will be obvious that various changes and modifications may be made therein without departing from the spirit and scope of the invention as defined in the following claims.

We claim:

1. A tower packing for contacting a first mobile phase in a first stream with a second mobile phase in a second stream comprising a plurality of vertically oriented corrugated sheets in face-to-face contact with opposed corrugations inclined oppositely to one another, each of said sheets having fold lines therein establishing ridges and valleys separated by flat areas, said ridges, valleys, and flat areas defining said corrugated configuration of said sheets, each of said flat areas being provided with a plurality of laterally extending louvers thereon, some of said louvers having upwardly facing edges and some having downwardly facing edges and substantially all of said louvers terminating adjacent, but short of, said fold lines.

2. A tower packing in accordance with claim 1 in which one of said mobile phases is a vapor and one is a liquid.

3. A tower packing in accordance with claim 1 in which both of said mobile phases are liquids.

4. A tower packing in accordance with claim 3 in which said liquids are immiscible and of different specific gravities and are arranged for passage through said packing in countercurrent flow.

5. A tower packing in accordance with claim 3 in which said liquids are at least partially mutually soluble or emulsifiable and are arranged for passage through said packing in co-current flow.

6. A tower packing in accordance with claim 1 in which said louvers include some projecting transversely outwardly from the respective planes of said flat areas and some projecting transversely inwardly from the respective planes of said flat areas.

7. A tower packing in accordance with claim 6 in which at least some openings through said corrugated sheets are defined by an outwardly projecting louver of a first kind on one side thereof and an inwardly projecting louver of a first kind on an opposed side thereof.

8. A tower packing in accordance with claim 1 in which at least some of said louvers are arranged in said flat areas in laterally aligned pairs.

9. A tower packing in accordance with claim 8 in which the louvers of said laterally aligned pairs have their respective edges oriented in the same vertical direction, and extend in the same transverse direction from the respective plane of said flat areas.

10. A tower packing in accordance with claim 1 wherein said louvers are formed in sets of companion louvers projecting outwardly from opposite sides of said sheet and defining a single opening therebetween.

11. A tower packing in accordance with claim 10 wherein at least two companion louver sets having a first orientation are disposed above at least two companion louver sets having a second, opposite orientation.

12. A tower packing in accordance with claim 11 in which said companion louvers are disposed in a pattern comprising at least two louvers on a first side of said sheet having upwardly facing edges disposed immediately above at least two louvers on said first side having downwardly facing edges.

13. A tower packing in accordance with claim 12 wherein said louvers are formed in said flat areas in a density on the order of at least eight louvers projecting transversely outwardly from said first side per square corrugation unit.

14. A tower packing for contacting a first mobile phase in a first stream with a second mobile phase in a second stream comprising a plurality of vertically oriented corrugated sheets in face-to-face contact with opposed corrugations inclined oppositely to one another, each of said sheets having fold lines therein establishing ridges and valleys separated by flat areas, said ridges, valleys, and flat areas defining said corrugated configuration of said sheets, each of said flat areas being provided with a plurality of laterally extending louvers thereon, some of said louvers having upwardly facing edges and some having downwardly facing edges.

15. A tower packing in accordance with claim 14 in which said louvers are arranged on said flat areas in generally parallel rows and in which a first plurality of louvers is arranged in a first row on a given flat area and a second plurality, differing from said first plurality, of louvers is arranged on a second row, on said given flat area.

16. A tower packing in accordance with claim 15 in which said first plurality is two and said second plurality is three.

17. A tower packing in accordance with claim 14 in which at least some of said louvers extend from one flat area onto an adjacent flat area.

18. A tower packing in accordance with claim 14 in which said louvers are arranged on said flat areas in generally parallel rows, and in which some rows contain one louver, and some rows contain a plurality of louvers.

19. An improved packing for contacting a first mobile phase with a second mobile phase in a process tower having a vertical axis therethrough, said packing being of the type comprising corrugated sheets disposed in face-to-face contact with opposed corrugations inclined oppositely to one another, each of the sheets having fold lines therein establishing ridges and valleys separated by flat areas, the ridges, valleys, and flat areas defining the corrugation configuration of the sheets; the improvement comprising each of said flat areas of said corrugated sheets being provided with a plurality of laterally extending companion louvers projecting outwardly from opposite sides of said sheet, defining a single opening therebetween, said companion louvers forming a pattern of slotted open areas in said sheets through which said mobile phases may pass.

20. A method in accordance with claim 19 in which one of said mobile phases is a vapor and one is a liquid.

21. A method in accordance with claim 19 in which both of said mobile phases are liquids.

22. A method in accordance with claim 21 in which said liquids are immiscible and of different specific gravities and are arranged for passage through said packing in countercurrent flow.

23. A method in accordance with claim 21 in which said liquids are mutually soluble or emulsifiable and are arranged for passage through said packing in co-current flow.

24. The apparatus as set forth in claim 19, wherein each of said slotted open areas have a width on the order of 45% of the width of said flat area.

25. The apparatus as set forth in claim 24, wherein said slotted open areas are formed in laterally aligned pairs along the width of said flat area.

26. The apparatus as set forth in claim 19, wherein said slotted open areas are formed in said flat area in a density on the order of at least eight slotted open areas per square corrugation unit.

27. The apparatus as set forth in claim 19, wherein said flat areas include a first louver type having upwardly facing edges and a second louver type having downwardly facing edges and said companion louvers comprise one of each louver type, oppositely disposed, and defining said slotted open areas therebetween.

28. A tower packing in accordance with claim 19 in which said louvers include a first louver type projecting transversely outwardly from the respective planes of said flat areas and a second louver type projecting transversely inwardly from the respective planes of said flat areas, and said companion louvers comprise one of each type, oppositely disposed, and defining said slotted area therebetween.

29. A tower packing in accordance with claim 19 wherein said louvers are formed substantially at a right angle to said tower axis.

30. A tower packing in accordance with claim 19 wherein said louvers are formed at a first acute angle relative to said corrugation ridges, said corrugation ridges being formed at a second acute angle relative to said tower axis, and the sum of said first and second acute angles being approximately 90°.

31. A tower packing in accordance with claim 19 in which the louvers of said laterally aligned pairs have their respective edges oriented in the same vertical direction, and extend in the same transverse direction from the respective plane of said flat areas.

32. An improved method of mixing a first mobile phase and a second mobile phase in a process column of the type wherein structured packing is provided in corrugated plates disposed in face-to-face relationship one with the other, said corrugated packing having ridges and valleys with flat areas therebetween and said plates having apertures formed therein for the passage of said mobile phases thereon and through the planes of said flat areas during the operation of said column, the improvement comprising the steps of:
  providing said corrugated plates with a plurality of louvers disposed in generally parallel spaced relationship one to the other;
  forming a first set of louvers with upwardly facing edges;
  forming a second set of louvers with downwardly facing edges;
  orienting adjacent ones of said louvers in opposite orientations one to the other, including,
  orienting some louvers to project transversely outwardly from the respective planes of said flat areas, and
  orienting some louvers to project transversely inwardly from the respective planes of said flat areas;
  discharging said mobile phases over said corrugated plates and said louvers in countercurrent flow thereover; and
  passing said countercurrently flowing mobile phases through certain ones of said louvers for enhancing the mixing therebetween.

33. A method in accordance with claim 32 in which one of said mobile phases is a vapor and one is a liquid.

34. A method in accordance with claim 32 in which both of said mobile phases are liquids.

35. A method in accordance with claim 34 in which said liquids are immiscible and of different specific gravities and are arranged for passage through said packing in countercurrent flow.

36. A method in accordance with claim 34 in which said liquids are at least partially mutually soluble or emulsifiable and are arranged for passage through said packing in co-current flow.

37. The method as set forth in claim 32 and further including the step of disposing said louvers in a lateral width on the order of 45% of the width of said flat area.

38. An improved method of mixing a first mobile phase moveable in a first stream with a second mobile phase moveable in a second stream in a process tower of the type wherein a plurality of vertically oriented corrugated sheets are designed in face-to-face contact with opposed corrugations inclined oppositely to one another, each of the sheets having fold lines therein establishing ridges and valleys separated by flat areas, the ridges, valleys, and flat areas defining the corrugated configuration of the sheets wherein the improvement comprises the steps of:
  forming said flat areas with a plurality of laterally extending companion louvers;
  projecting said companion louvers outwardly from opposite sides of said sheet;
  defining a single opening between said companion louvers through which said mobile phase streams may pass;
  discharging said first mobile phase in said first stream downwardly over said companion louvers of said sheets;
  passing said second mobile phase in said second stream upwardly over said companion louvers of said sheets; and
  passing said mobile phase streams through certain ones of said companion louvers for enhancing the mixing therebetween.

* * * * *

UNITED STATES PATENT AND TRADEMARK OFFICE
CERTIFICATE OF CORRECTION

PATENT NO. : 5,185,106

DATED : February 9, 1993

INVENTOR(S) : Gilbert K. Chen, Robert McKelvy, Jorge A. Bonilla, Don Glaspie, George De Bruyn It is certified that error appears in the above-identified patent and that said Letters Patent is hereby corrected as shown below:

Abstract, line 2         Delete "the"
                         Insert --The--

Column 7, line 17        Delete "framentary"
                         Insert --fragmentary--

Column 7, line 34        Delete "will"
                         Insert --wall--

Column 8, line 68        Delete "present"
                         Insert --preset--

Column 10, line 64       after process, insert
                         --columns--

Signed and Sealed this

Sixteenth Day of November, 1993

BRUCE LEHMAN

*Attest:*

*Attesting Officer*          Commissioner of Patents and Trademarks